Patented May 29, 1923.

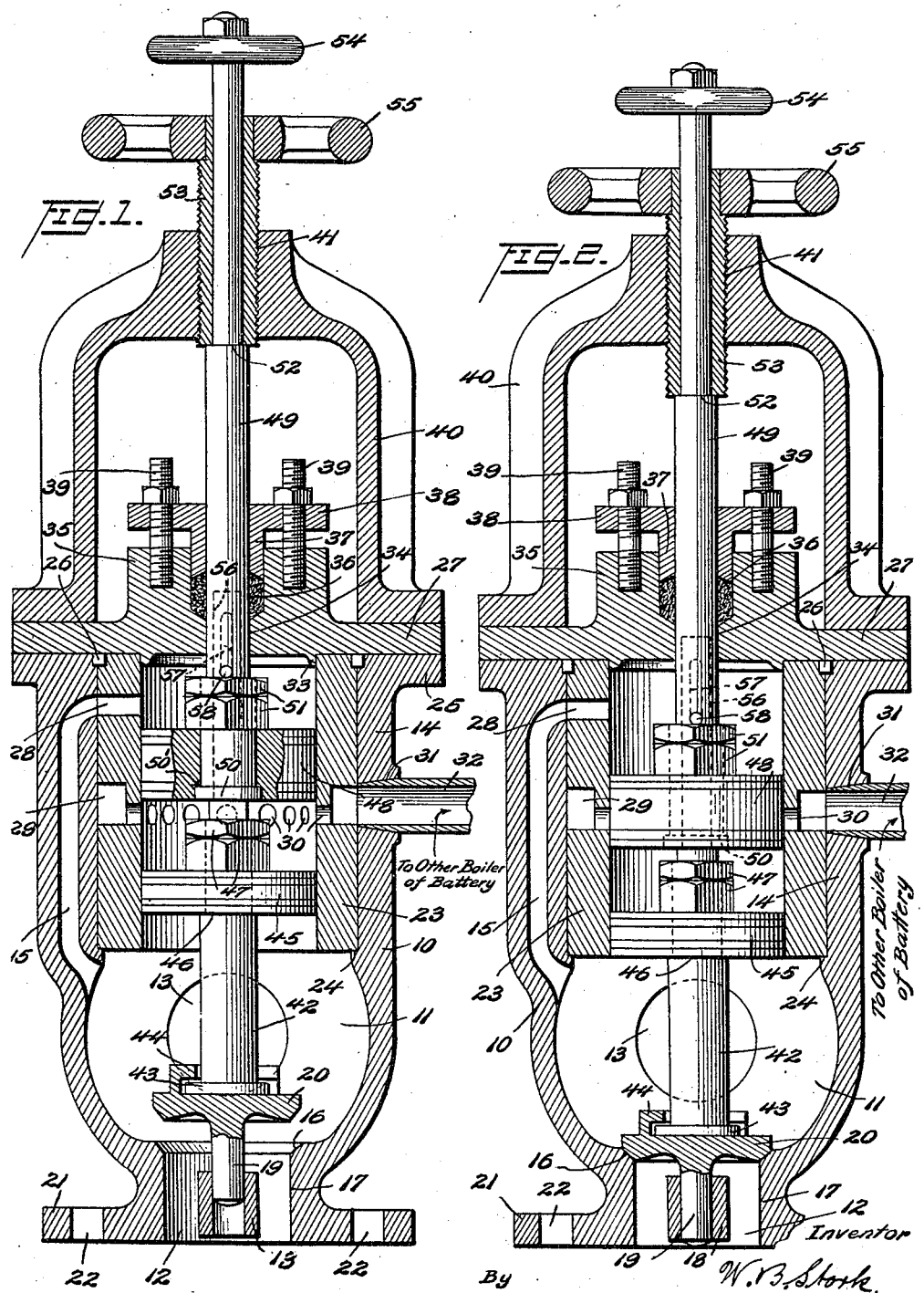

1,456,946

UNITED STATES PATENT OFFICE.

WILLIAM BOTELER STORK, OF ANDOVER, MASSACHUSETTS.

AUTOMATIC STEAM-STOP VALVE.

Application filed January 26, 1921. Serial No. 440,098.

*To all whom it may concern:*

Be it known that I, WILLIAM B. STORK, a citizen of the United States, residing at Andover, Essex County, State of Massachusetts, have invented certain new and useful Improvements in Automatic Steam-Stop Valves, of which the following is a specification.

This invention relates to automatic valves intended primarily for use in the connection between a boiler and a steam main which is supplied from a number of boilers and is of the same general type as that covered by my pending application, Serial Number 331,-
432, filed October 17, 1919. It is designed to automatically open or close as the relative pressures in the boiler and in the steam main vary, and also to automatically close in case the pressure in the main suddenly falls very materially below normal, as would be caused by a break in the main. It normally closes when the pressure in the boiler is less than that in the main, and thus if the boiler bursts it will close, thus preventing loss of steam from the main. The object of the present invention is to simplify and improve the structure set forth in my prior application mentioned above. The novel features will be clear from the following description and claims taken with the drawings.

In the drawings:

Figure 1 is a vertical section through the valve with the parts in open position, and Figure 2 is a similar view with the parts in closed position.

In the embodiment of the invention shown in the drawings there is a valve casing or body 10 formed in the usual way of metal, having therein a chamber 11 provided with an inlet opening 12 for steam from a boiler, an outlet opening 13 leading to the steam main, an open end cylindrical portion 14 in line with the inlet 12, and a passageway 15 in the wall of the cylindrical portion forming a branch steam connection between said chamber and the outer end of said cylinder. The inlet opening is provided at its margin with an inwardly facing valve seat 16 and the tubular portion 17 below it has transversely of it a fixed guide member 18 provided with a central cylindrical guide opening to receive and slidably engage an integral downwardly extending projecting guide member 19 on the bottom of the valve 20. A laterally extending flange 21 is formed at the lower end of the valve casing 10 around the inlet opening, and is provided with bolt holes 22 for fastening it to the boiler or a connection leading to the boiler. In the form shown, a cylindrical bushing 23 is placed in the cylindrical portion 14 through the open top and closely fits it and at its lower edge rests on the small interior ledge 24 left in the casing in boring out the upper portion. The upper end of this bushing is flush with the upper end of the cylindrical portion 14 and its peripheral flange 25.

The space 26 represents a pin or "dutchman" to prevent bushing 23 from turning and closing openings 28. The bushing 23 is to be forced in with white lead to make a steam tight joint. The bushing also has an opening or passageway 28 through its upper portion registering with the passageway 15, so that steam from the main may enter it, and the bushing near its central portion is provided on its outer side with a peripheral groove 29 having radial openings 30 at regular intervals connecting it to the interior of the bushing. The cylindrical portion 14 of the casing 10 is provided with an inlet opening 31 registering with and discharging into the groove 29 and having pipe connection 32 to a source of fluid under a pressure separate and distinct from the main but substantially equal to the normal pressure in the steam main and chamber 11, and for this purpose the pipe 32 is preferably connected to one of the other of the battery of boilers supplying the steam main. The cover plate 27 has a centering rib 33 fitting within the upper end of bushing 23 and also has a central cylindrical guide opening 34 extending therethrough. On the outer or upper side of said plate 27 there is a boss 35 the central opening being counterbored to receive packing 36 and the adjustable packing gland 37. The packing gland has a central guide opening of the same size as opening 34 and has a marginal flange 38 projecting out over the end of the cylindrical projection 35, and is adjustably secured thereto by screw threaded studs and nuts 39. A yoke or frame 40 at its lower end rests on the flange 27 of the cover plate and on its central upper cross portion is provided with a screw threaded opening 41. It will be understood that the yoke 40, cover plate 27, and the upper end of the cylindrical portion

14 are securely fastened and clamped together by well known means to make a steam tight joint.

The operative parts of the valve mechanism include a rod or stem 42 having at its lower end a head 43 making connection with a grooved socket 44 on the upper face of valve 20 and causing said valve and stem to move together longitudinally but providing sufficient looseness to permit the steam to reach and its pressure to act on all parts. The stem or rod 42 extends centrally through and beyond a piston 45 fitting within the lower portion of the cylindrical inner surface of bushing 23 and is reduced in diameter at and beyond said piston, the shoulder 46 formed by the reduction serving as a support for the piston. Clamp nuts 47 on the rod on the upper side of the piston serve to complete the rigid connection between them. A second or upper piston 48 fits within the cylinder formed by bushing 23 and when the valve is operating to admit steam to the main occupies a position above the side openings 30 as shown in Figure 1. A cylindrical rod or shaft 49 of varying diameter passes centrally up through piston 48 having an enlarged lower end or head 50 fitting against shoulder 50' at the lower end of the piston and with clamp nuts 51 above the piston to hold it in place thereon. Above these clamp nuts the diameter of the rod 49 is reduced and it passes out through the opening 34, packing 36 and packing gland 37, and further up is reduced again, forming a shoulder 52 below the cross part of the yoke 40. The outer reduced end slidably passes through the central tubular opening in the screw threaded sleeve 53 which fits and is adjustable in the screw threaded yoke opening 41 in the yoke. An operating handle or wheel 54 is secured to the upper end of rod or shaft 49 and a similar but larger operating wheel 55 is secured to the upper end of sleeve 53. The rod 49 has in its lower end a cylindrical central upwardly extending socket or opening 56 to slidably receive the upper reduced end of the rod or stem 42 secured to the lower piston 45 as illustrated in dotted lines. The telescoping portion of rod 42 has a longitudinal slot 57 of limited extent or length and a pin 58 extending through the tubular part of rod 49 enters that slot and limits the relative longitudinal movement of said rods.

It will be noted from what has been said above that when the parts are as shown in Figure 1 the valve with its stem 42 and the attached piston 45 are freely movable down to closed position without movement of the upper piston 48 or its rod 49, the pin and slot connection 57, 58 permitting that much free movement. This figure shows the device in normal operative adjustment and the valve 20 will automatically move up or down to open or close the inlet as the relative pressure in the chamber 11 and in the boiler varies, the valve closing through gravity and the lowering of pressure beneath it as compared with the pressure in the main and rising when the pressure in the boiler so far exceeds that in chamber 11 and the main as to lift the valve and its parts from its seat. If the boiler pressure falls substantially below that in the main the valve will close until the pressure reaches the proper point to supply the main, and it will of course suddenly close if the pressure in the boiler falls suddenly as in the case of a broken tube or explosion, and thus waste of steam from the main to the injured boiler is avoided.

Since however the valve normally opens when the pressure in the boiler exceeds that in the main, and since sometimes an unusual situation arises which calls for the reverse of that action, as when the main breaks and there is suddenly no appreciable pressure in it or a very materially lower pressure than normal, the present invention includes the additional valve control elements including the two pistons to bring about a closing of the valve in such emergency. The pistons 45 and 48 are normally balanced by substantially the same pressure on opposite sides, and thus under normal conditions do not interfere with the natural operation of the valve above described, but when the main line breaks and the pressure in chamber 11 suddenly falls to a very material degree, the pressure of the steam from another boiler or source in the space between the pistons will so greatly overbalance the upward pressure on the under surface of the lower piston and the upward pressure on the under surface of valve 20 as to quickly force that valve to its seat and hold it there, thus shutting off the boiler from the broken main. In this structure the upper piston and its structural connections and arrangement provide mechanical means for controlling the valve while permitting the automatic action in one adjustment. To illustrate: when the valve is open and the parts in the position shown in Figure 1, the sleeve 53 may be turned by the hand wheel 55, and in its downward travel due to the threads it will by engaging shoulder 52 force rod 49 downward, carrying the piston 48 with it, and since that piston can not approach the lower piston 45 beyond the shoulder on rod 42 just above the lock nuts 47, that second piston and its rod 42 and the valve 20 will be carried down to closed position, as shown in Figure 2 and mechanically held closed. In its downward movement the piston 48 passes over and closes openings 30, thus cutting off the supply of steam from a separate source to the space between the pistons. To then set the valve for operation, the sleeve 53 is turned in the reverse direction until it is in the position shown in Figure 1, but the valve rod 49 in this instance does not move with it because of its movement but remains in the position shown in Figure 2, with the valve closed so long as the pressure in the boiler does not so far overbalance that in chamber 11 as to raise the valve and through it move the two pistons up to the position shown in Figure 1. When piston 48 is thus raised, it moves over and opens the ports 30 for the steam pressure between the pistons and thereafter has substantially equal steam pressure on its lower surface through ports 30 and on its upper surface through the passageway 15, and is thus in a sense balanced. Even when in lowered position cutting off ports 30 the pressure on its upper face balances that on the lower face of piston 45, and thus there is no pressure resistance to free movement or pressure tending to move it from adjusted position.

Having thus described my invention, what is claimed as new and desired to be secured by Letters Patent is:

1. In an automatic stop valve, the combination with a valve body having a chamber therein provided with an inlet opening having an inwardly facing valve seat and an outlet opening and a cylindrical extension in line with the inlet opening, of a valve in said chamber fitting said valve seat and movable therefrom in the line of said cylinder, a piston in the end portion of said cylinder facing the valve, a connection between said piston and valve a second piston in said cylinder beyond and spaced from said first piston, the said pistons being movable within limits with reference to each other, cooperating means for limiting the approach of said pistons towards each other, means for maintaining fluid pressure on the outer face of said second piston equal to that in said chamber to which the face of said first piston is exposed, mechanical means for moving said second piston to such position as to close said valve through the interposed first piston and connection or to a position such as will permit said valve to open, and a port with which said second piston cooperates for supplying fluid independent of but under substantially the same pressure as that in the chamber to the space in said cylinder between said pistons when the valve is open.

2. An automatic valve for connecting a boiler to a steam main, comprising in combination a valve body or casing having a chamber therein provided with an inlet opening from the boiler having an inwardly facing valve seat and an outlet connection to said steam main and a cylindrical extension in line with the inlet opening, of a valve in said chamber fitting said seat and movable therefrom towards said cylinder, a piston in said cylinder exposed on its under surface to the steam pressure in said chamber, connecting means between said piston and valve whereby they move together, said cylinder having a port for supplying a fluid from a source separate from the steam main but under substantially the same pressure as the normal pressure in the steam main to the upper side of said piston, thus so balancing it normally as to permit the valve to automatically open or close as the relative pressure in the boiler and steam main varies, but causing the valve to close through the overbalance of pressure on said piston when the pressure in the main suddenly falls much below normal as by a break in it, and a second piston in said cylinder above said first piston exposed on its upper or outer face to the steam pressure in the main and movable within limits towards and away from said first piston adapted in its lower position to close the valve and said port, and in its upper position to open said port, and to permit the valve to open.

3. An automatic stop valve including in combination, a valve body formed with a chamber having an inlet passage and an outlet passage, a valve controlling the inlet passage constructed to close when the pressure in the inlet passage is less than in the chamber, a cylinder, a stem connected with the valve extending into said cylinder, a pair of spaced pistons in said cylinder, the one adjacent the valve being secured to said stem, a slidable spindle secured to the other piston and projecting outside the cylinder, said stem and second piston being connected for limited relative longitudinal movement, the spaces at the opposite ends of said pistons being in communication with fluid at the same pressure as in the outlet passage, said cylinder having a port for supplying a fluid under substantially the same pressure as the normal pressure of the steam in the inlet to said cylinder at such point above the first mentioned piston that the port will be closed by said second mentioned piston when moved towards the first mentioned piston but opened when moved in the opposite direction.

4. An automatic valve for connecting a boiler to a steam main, comprising in combination a valve body or casing provided with a chamber having an inlet from the boiler and an outlet to the steam main, an automatic control valve for said inlet adapted to normally open on an excess of pressure in the boiler, and close on an excess of pressure in the steam main, of a cylinder containing two spaced pistons having free limited relative movements substantially equal to the normal movement of the valve, means connecting one piston to move with the valve, means for normally balancing the pressure on said pistons by means of steam connection from the main to their outer surfaces and a port in the cylinder wall adapted to be connected to another source of fluid under substantially equal pressure said port opening into the space normally between the pistons, and means for moving said second piston to close said port when the valve is closed.

5. An automatic valve for connecting a boiler to a steam main, comprising in combination a valve body or casing having a chamber therein provided with an inlet opening from the boiler having an inwardly facing valve seat and an outlet connection to said steam main and a cylindrical extension in line with the inlet opening, of a valve in said chamber fitting said seat and movable therefrom towards said cylinder, a piston in said cylinder exposed on its under surface to the steam pressure in said chamber, a stem loosely connected to said valve extending centrally through and beyond said piston and secured thereto to move therewith, a second or upper piston in said cylinder having a stem or rod secured thereto slidably passing upwardly and through the top of the body or casing and having centrally in its lower end a cylindrical socket to slidably receive the upper end of the said valve stem, means for limiting the relative sliding movement of said stem and the approach of the pistons towards each other, means for supplying a fluid from a separate source but of substantially the same pressure as that in the casing and main to the space in the cylinder which is between the pistons in operating position, means for supplying steam to the outer face of said second piston connected to the main, and mechanical means for moving said sliding rod or stem and said connected piston down over the inlet for said fluid under pressure to cut off the supply.

6. An automatic stop valve including in combination, a valve body formed with a chamber having an inlet passage and an outlet passage, a valve controlling the inlet passage constructed to close when the pressure in the inlet passage is less than in the chamber, an open ended cylinder in line with said valve opening having a connection at its upper end to said chamber and having an inlet connection near its central portion to admit fluid from an independent source under substantially the same pressure as the normal steam pressure in the main, a pair of spaced pistons in said cylinder below said upper connection and adapted when the valve is open to occupy positions above and below the inlet for fluid under pressure, a closure for the upper end of said cylinder, a rod slidably passing through said closure and secured to the upper piston, means including a limited amount of lost motion for moving said rod and its piston downwardly towards the valve to cut off supply of fluid under pressure through said inlet connection, means so connecting said pistons as to permit a limited amount of free relative movement, and a rod or stem connecting the inner or lower piston to said valve to move therewith.

In testimony whereof I affix my signature.

WILLIAM BOTELER STORK.